United States Patent [19]

Kober et al.

[11] 4,325,711

[45] Apr. 20, 1982

[54] METHOD OF CONDITIONING FLUE GAS AND SEPARATING THE PARTICLES THEREFROM

[75] Inventors: Alfred E. Kober, Bridgewater; Dennis F. Mahoney, Three Bridges, both of N.J.

[73] Assignee: Apollo Technologies, Inc., Whippany, N.J.

[21] Appl. No.: 149,961

[22] Filed: May 15, 1980

[51] Int. Cl.³ .......................... B03C 3/01; B01D 51/10
[52] U.S. Cl. ............................................ 55/5; 55/262; 55/267; 55/DIG. 25
[58] Field of Search ................... 55/5, 11, 261, 262, 55/267, DIG. 25

[56] References Cited

U.S. PATENT DOCUMENTS

| | | | |
|---|---|---|---|
| 4,042,348 | 8/1977 | Bennett et al. | 55/5 |
| 4,043,768 | 8/1977 | Bennett et al. | 55/5 |
| 4,070,162 | 1/1978 | Kober et al. | 55/5 |
| 4,113,447 | 9/1978 | Bennett et al. | 55/5 |
| 4,177,043 | 12/1979 | Albanese | 55/5 |
| 4,238,203 | 12/1980 | Jaworowski et al. | 55/5 |

FOREIGN PATENT DOCUMENTS

| | | | |
|---|---|---|---|
| 2907018 | 8/1979 | Fed. Rep. of Germany | 55/5 |
| 430891 | 11/1974 | U.S.S.R. | 55/5 |

*Primary Examiner*—David L. Lacey
*Attorney, Agent, or Firm*—James & Franklin

[57] ABSTRACT

The collection characteristics of particles entrained in a particle-laden gas for separation by the commonly used methods for removing particles from a gas stream are improved by injecting into the gas stream a conditioning agent comprising diammonium phosphate and urea. The conditioning agent can be added to the gas stream either at low temperatures or at high temperatures, in both cases giving rise to significant improvements in emission characteristics. The additive of the present invention has a very significant advantage over prior art additives of substantially equal emission improvement characteristics of greatly reducing or substantially eliminating buildup of hard-to-remove deposits.

30 Claims, No Drawings

METHOD OF CONDITIONING FLUE GAS AND SEPARATING THE PARTICLES THEREFROM

The invention relates generally to a method of separating particulate material from a gas stream and, more specifically, to a method of chemically conditioning a particle-laden gas stream to cause the suspended particles to be removed more efficiently by any of the commonly used methods for removing particles, e.g. fabric filters, inertial separators and electrostatic precipitators. When the additive is used in conjunction with electrostatic precipitators, it is most effectively added to the gas stream at a relatively high temperature, and when thus used the additive of the present invention minimizes or eliminates the buildup of deleterious hard-to-remove deposits. When used in conjunction with mechanical particle removing devices, it may be injected at relatively low temperatures, and when thus used is characterized by minimal clogging problems.

As man becomes increasingly aware of the need to preserve and protect the quality of his environment, more stringent laws are being passed limiting the amount of particulate matter that may be released to the atmosphere during the mining, processing and consuming of various minerals, fuels, etc. These laws generally define the results to be achieved in terms of a maximum amount of particulate matter per unit of gas escaping from the stack, a maximum degree of opacity of the stack gas, or both. In order to make it possible for industry to comply with these regulations, pollution control hardware companies offer various devices for removing particles from gas streams. One type of device operating electrically is an electrostatic precipitator. There are also mechanical separation devices that are widely used, such as fabric filters (bag houses) and inertial separators (cyclones).

Electrostatic precipitators utilize a corona discharge to charge the particles passing through an electric field established by a plurality of discharge electrode wires suspended by insulators in a plane parallel to a grounded collecting electrode plate. The charged particles are attracted to the collector plate from which they may be then removed by vibrating or rapping the plate. Examples of this type of precipitator are found in U.S. Pat. Nos. 3,109,720 and 3,030,753.

When high collection efficiency for small particle size is required, fabric filters are often the method of choice for separating the dust from the air. The fabric is usually made into bags of tubular or envelope shape. The entire structure housing the bags is called a bag house.

Filter fabrics normally used to remove dust and fumes from air streams are usually woven with relatively large open spaces, sometimes 100 microns or larger in size. Since separation efficiencies for dust particles of 1 micron or less may exceed 90 percent, the filtering process obviously is not just simple sieving. Small particles are initially captured and retained on the fibers of the cloth by means of interception, impingement, diffusion, gravitational settling and electrostatic attraction. Once a mat or cake of dust is accumulated, further separation is accomplished by sieving as well as by the previously mentioned methods. The fabric then serves mainly as a supporting structure for the dust mat responsible for the high separation efficiency. Periodically the accumulated dust is removed for disposal by mechanical shaking or momentary "pulses" of high pressure air, etc. Some residual dust remains and serves as an aid to further filtering.

Inertial separators are widely used for collecting medium (15-40 microns) and coarse-sized particles. Ordinary inertial separators are generally unsuitable for fine dusts or metallurgical fumes. Dusts with a particle size ranging from 5 to 10 microns are normally too fine to be collected efficiently. In some cases, however, small diameter, high efficiency cyclones can be effective in separating particles in the 5 micron range.

A cyclone, which is an inertial separator without moving parts, separates particulate matter from a gas stream by transforming the velocity of an inlet stream into a double vortex confined within the cyclone. In the double vortex the entering gas spirals downward at the outside and spirals upward at the inside of the cyclone outlet. The particles, because of their inertia, tend to move toward the outside wall, from which they are led to a receiver.

While these electrical and mechanical particle separating devices are quite helpful in minimizing the amount of particulate emission from a power plant or the like, their effectiveness is dependent upon a variety of factors particularly revolving about the specific nature of the particles to be removed from the gas stream, and the controlling particle characteristics vary depending upon the type of particle removing device employed in a given installation. When electrostatic precipitators are employed, one of the major operative particle characteristics is their resistivity, as is set forth in considerable detail in Bennett et al U.S. Pat. No. 4,042,348 of Aug. 16, 1977 entitled "Method of Conditioning Flue Gas to Electrostatic Precipitator", Bennett et al U.S. Pat. No. 4,043,768 of Aug. 23, 1977 entitled "Method of Conditioning Flue Gas to Electrostatic Precipitator", and Bennett et al U.S. Pat. No. 4,113,447 of Sept. 12, 1978 entitled "Method of Conditioning Flue Gas". The major operative characteristics involved when mechanical separators are employed are set forth in some detail in Kober et al. U.S. Pat. No. 4,070,162 of Jan. 24, 1978 entitled "Method of Agglomerating Particles in Gas Stream". All of these patents are assigned to the assignee of this application.

The use of additives of the types disclosed and claimed in the above mentioned patents has been quite effective in enabling power plants burning varying types of fuel to meet even quite stringent emission requirements. However, in some instances, either because of power plant peculiarities, the specific nature of available fuels, or particularly stringent statutory or regulatory requirements, even those additives when used to their maximum effect have not enabled a particular installation to achieve the desired degree of emission control. In addition, the use of these additives even when effective to meet emission requirements have sometimes presented problems of their own, particularly involving buildup of deposits on the surfaces of the superheat and reheat sections, air heater or other heat transfer device, filters, screens and the like, which buildup eventually so clogs the passages and/or so thermally insulates the heat-transfer surfaces therein as to require that the installation be periodically shut down so that the deposits can be removed. At best this is a time-consuming, and therefore quite costly, task. Every minute that a power plant is shut down is an economic dead loss. Moreover, it frequently happens that the deposits that form, and particularly those that form at relatively high temperatures, are extremely hard, and therefore very difficult to remove, thus aggravating the problems involved. Particularly this is true with additives such as ammonium sulphate and ammonium bisulphate, the subjects of U.S. Pat. Nos. 4,043,768 and 4,042,348, which are injected into the gas stream when that stream is at a temperature of 590°–900° C. Such additives are injected at high temperatures in order to minimize the tendency of such additives to clog the air heaters, but the high injection temperatures themselves tend to sinter the deposits which build up at or around the point of injection, as well as elsewhere in the furnace, and sintering results in the formation of deposit masses which are very hard and tough, and hence very difficult to remove.

In accordance with the present invention, we have found that an additive composed of diammonium phosphate and urea has exceptional emission-improving characteristics whether used in conjunction with electrical or mechanical separating devices. When used with mechanical separating devices the additive may be introduced into the gas stream at relatively low temperatures, even downstream of the air heater or other heat transfer device, if that is desired, thus avoiding plugging action in the mechanical separating device. When an electrostatic precipitator is employed the additive of the present invention is preferably introduced into the gas stream upstream of the air heater at a relatively high temperature, and when so used it not only minimizes any buildup in the air heater but also minimizes buildup in the vicinity of the point of injection, and in particular minimizes the sintering action which tends to cause the buildup of very hard deposits. Hence in troublesome installations using either electrical or mechanical particle separating devices, the additive of the present invention represents a marked improvement over prior art additives known to us. The additive of the present invention provides as good and often better emission control than such prior art additives, and in addition minimizes the plugging and sintered buildup deleterious side effects of those prior art additives under certain conditions.

For example, in one industrial installation where an ammonium sulphate additive of the type taught in Bennett U.S. Pat. No. 4,043,768 was used in conjunction with an electrostatic precipitator, air heater deposits presented so serious a problem, when the ammonium sulphate was injected at high temperatures in quantities sufficient to produce the desired minimization of emission, as to make the use of the additive impractical from an operational point of view. In an attempt to solve that problem, it was decided to try diammonium phosphate as an additive, injected at gas temperatures of about 1000°–1300° F. This step did reduce air heater deposits somewhat while giving essentially satisfactory emission control, but only at the expense of extremely marked buildup of deposits at and around the injection areas, which deposits sintered at the high temperatures to which they were subjected, thus becoming very hard and difficult to remove.

This problem was solved by combining with the diammonium phosphate a substantial amount of urea. With the addition of the urea, buildup of deposits in the air heater greatly decreased, buildup of deposits in the high temperature areas greatly decreased, those deposits which did occur were no longer sintered, and all deposits were easily removed.

When diammonium phosphate alone is used in conjunction with mechanical particle separating devices, it may be injected at relatively low temperatures, either upstream of the air heater or between the air heater and the mechanical separator, but when that is done buildup of deposits in the mechanical collector and in the air heater if applicable are excessive. When urea is added to the diammonium phosphate, injected at low temperature, however, the buildup of deposits in the air heater and/or separator is significantly reduced.

Thus the flue gas conditioning additive of the present invention, comprising diammonium phosphate and urea, represents an improvement over prior art additives both when used in conjunction with an electrostatic precipitator, in which case it is usually injected at high temperatures, or with mechanical separating devices, in which case it is usually injected at low temperatures, in both instances producing excellent emission control with only minimal buildup of deposits, and when injected at high temperatures substantially preventing the sintering and consequent hardening of the high temperature deposits, making them much easier to remove when they form.

(Throughout this document the terms "high temperature" and "low temperature" refer to relative temperatures, which are not particularly critical nor rigorously definable. These temperatures may vary from installation to installation, and will also vary in a given installation as operating conditions, and particularly fuel consumption rate, varies. As a general rule of thumb, "high temperatures" are those generally prevailing upstream of the air heater and near the actual fuel combustion area, and may be in the approximate range of 600°–1400° F., while "low temperatures" are those generally prevailing well downstream of the fuel combustion area, close to and even downstream of the air heater, and may be around 300° F.)

The urea and diammonium phosphate may be injected into the gas stream in the form of finely divided solid particles, but it is preferred, primarily for convenience in manipulation purposes, that they be introduced into the gas stream in the form of a water solution. The amount of water involved is not in any way critical. As a general rule, at least enough should be used to dissolve the solids, but once the solution enters the furnace the water will evaporate, leaving the solids behind. What is required is that the solids be finely divided and thoroughly dispersed so as to contact the particulate material in the flue gas before those particles enter the precipitator or mechanical separation device.

The proportions of diammonium phosphate and urea may vary between 80–20% by weight of solids for diammonium phosphate and 20–80% by weight of solids of urea. In a typical water solution, having 75% by weight of water, the diammonium phosphate may be present in amounts between 20–5% by weight of the entire solution and the urea in amounts between 5–20% by weight of the entire solution. A formulation found to give particularly good results is one involving 75% by weight water, 15% by weight diammonium phosphate and 10% by weight urea.

The amount of additive used may vary widely, depending upon the magnitude of the emission control problem, the nature of the fuel being burned, the peculiarities of the particular power plant installation, and the like. It has also been found that the amount of additive required may vary depending upon whether it is injected at high temperatures, in connection with an electrostatic precipitator, or at low temperatures, in connection with mechanical separating devices. To state the matter quantitatively, it is convenient to talk in terms of a typical solution, such as the one set forth above involving 75% water, 15% diammonium phosphate and 10% urea. Such a standard solution may be injected in amounts of 0.05–1.5 gallons of solution per ton of fuel burned. When injection is at a low temperature, the injection rate is preferably around 0.2–1.0 gallons of such solution per ton of fuel while injection at high temperatures preferably involves providing such a standard additive solution at a rate of between 0.1 and 0.5 gallons of solution per ton of fuel burned. It will be understood that since it is the solids (diammonium phosphate and urea) which are active, variations in the water content of the solutions, or the use of the active materials in the dry form in the first instance, would call for different absolute injection rates so as to provide a rate of feed of the solids involved essentially equivalent to the rate of feed of the solids content of said standard solution.

In one electric generating plant utilizing an electrostatic precipitator, diammonium phosphate alone was injected at high temperatures into the stream of flue gas at rates of between 0.25 and 0.45 gallons of a 25% solution of diammonium phosphate per ton of coal burned. Stack emissions were maintained in compliance with regulatory requirements, but severe ash buildups occurred inside the boiler, which buildups were relatively soft on their exposed surfaces but extremely hard in the deeper portions thereof, and particularly in those portions directly on the boiler tubes. The buildups formed bridges from one tube to another, and those severely restricted flow through the boiler. The buildups strongly resisted attempts to dislodge them. When a water solution of 15% diammonium phosphate and 10% urea was used instead of the 25% solution of diammonium phosphate, injected at the same rate as the diammonium phosphate solution and at the same flue gas temperatures, there was a very significant reduction in the amount of buildup, very little tube bridging occurred, and the deposits that did bridge across the tubes were more friable than that encountered with the solution of diammonium phosphate alone. The deposits which formed when the diammonium phosphate-urea solution was employed were porous and fragile, and were easily removed by the operation of a soot blower. The use of the diammonium phosphate-urea solution resulted in essentially the same reduction in stack emission as did the diammonium phosphate solution, but with significantly less buildup, and the buildup that did occur was much more easily removed. (At the time of the changeover to the diammonium phosphate-urea solution, some changes were also made in the injection probe configuration, but those changes were not of a type that could have accounted for the dramatic reduction in buildup that was observed.)

In another installation utilizing an electrostatic precipitator particulate stack emissions and opacity were measured over a period of time under various boiler and chemical treatment conditions. Initially, and before any chemical treatment of the flue gas, emissions were at the rate of 3,500 pounds per hour and the opacity of the stack gas was greater than 80%. Actions not involving chemical treatment reduced particulate emissions, but only to 1,290 pounds per hour and opacity was reduced to around 50%. Next injection of an aqueous solution of 40% diammonium sulphate and 1.8% urea was carried out at a rate of 0.13 gallons per ton of fuel burned and at temperatures of about 800°–1200° F.. This resulted in a reduction of particulate emissions to 797 pounds per hour and an opacity reduction to around 40%. However, air heater pluggage gave rise to an increase of approximately 0.5 in water column in pressure differential across the air heater, an inadmissible value, feed of additive was reduced to 0.10 gallons per ton of fuel burned, and as a result emissions rose to 1,050 pounds per hour.

Thereafter an injection solution of 15% diammonium phosphate and 10% urea was employed at rates of from 0.20 to 0.35 gallons per ton of coal burned. Particulate emissions were reduced to 147 pounds per hour and opacity was reduced to 10%. When the diammonium phosphate-urea solution was employed no significant air heater pluggage occurred, enabling the use of sufficiently great rates of injection to provide an improved emission characteristic. Hence the diammonium phosphate-urea solution is seen to represent a significant improvement over diammonium sulphate in deposition characteristics while still maintaining good flue gas conditioning properties.

In an attempt to investigate the effect of the diammonium phosphate-urea combination additive in the laboratory, and particularly the effect of that combination in solving problems of deposit buildup, a laboratory procedure was evolved. In that procedure solutions were formed of the additive compositions tested, and the additive solution, in droplets larger than 100 microns in diameter, were injected at a rate of 3 gallons per hour at a temperature of about 345° F., and fly ash was also fed at the rate of about 7.5 pounds per hour. The additive and the fly ash formed a synthesized flue gas which was directed onto a stainless steel collection plate maintained at a temperature of about 290° F., the "flue gas" velocity being about 13.3 feet per second and its volume being 319 cubic feet per minute. The collection plate was maintained, approximately 4 feet downstream from the additive injection point. These tests were carried out at these extremely high concentrations of additive, water and fly ash in order to accentuate deposit formations. After each stainless steel plate was subjected to this test for a period of 80 minutes, it was placed into an oven at 350° F. for a period of 24 hours, in order to subject the accumulated deposit to sintering conditions. At the conclusion of oven heating, each plate was examined to determine the extent of sintering.

In test number 1 the additive consisted of 95.8% water, 2.5% diammonium phosphate and 1.7% urea. In test number 2 the additive consisted of 93.3% water, 0.8% urea, 5.7% diammonium sulphate and 0.2% of a substance sold under the trade name of "Petro AG Special". In test number 3 the additive consisted of 94.9% water, 2.25% diammonium phosphate, 2.1% potassium carbonate and 0.75% phosphoric acid. Other tests were conducted with variations in the chemical and weight percents of the formulations in tests 1, 2 and 3. For test 1, using the diammonium phosphate-urea combination, the deposition rate was 4.75 grams per minute, but no sintering occurred. For the formulations of tests 2 and 3 the deposition rates were 2.00 and 2.69 grams per minute respectively, but in each instance extensive sintering occurred. While the diammonium phosphate-urea combination, in these laboratory tests, showed relatively high deposition rates, the deposits were completely soft and friable, and easily removed from the plates, whereas the deposits in tests 2 and 3 were extensively sintered and formed rock-like masses which strongly resisted removal from the plates.

It will be noted that these laboratory experiments were carried out at relatively low injection temperatures in the neighborhood of 300° F., thus indicating the effectiveness of the diammonium phosphate-urea additive, when injected at low temperatures, in producing deposits which do not sinter into hard masses but instead are completely soft and friable, so as to be either self-removing or very easily removed.

While a limited number of embodiments of the present invention have been here set forth, it will be apparent that many variations will be made therein, all within the scope of the instant invention as defined in the following claims.

We claim:

1. A method of conditioning a particle-laden gas and minimizing the formation of deposits as a result thereof which comprises:
   (1) Forming, at a temperature above 600° F., a mixture of the particle-laden gas and a conditioner comprising diammonium phosphate and urea, the urea being present in the conditioner in an amount by weight between 20% and 80% of the combined solids content of diammonium phosphate and urea, and
   (2) Thereafter passing said mixture through a particle collector and separating said gas from the particles therein.

2. The method of claim 1, in which said gas is formed from the burning of fuel and said additive is added to said particle-laden gas at a solids rate equivalent to adding to said gas a solution of 25% solids in 75% water at the rate of about 0.2–1.0 gallons of solution per ton of fuel burned to produce said gas.

3. The method of claim 1, in which said diammonium phosphate and urea are present in proportions by weight of about 3:2.

4. The method of claim 3, in which said gas is formed from the burning of fuel and said additive is added to said particle-laden gas at a solids rate equivalent to adding to said gas a solution of 25% solids in 75% water at the rate of about 0.2–1.0 gallons of solution per ton of fuel burned to produce said gas.

5. The method of claim 3, in which said conditioner is in the form of a water solution when mixed with said particle-laden gas.

6. The method of claim 5, in which said gas is formed from the burning of fuel and said additive is added to said particle-laden gas at a solids rate equivalent to adding to said gas a solution of 25% solids in 75% water at the rate of about 0.2–1.0 gallons of solution per ton of fuel burned to produce said gas.

7. The method of claim 1, in which said conditioner is in the form of a water solution when mixed with said particle-laden gas.

8. The method of claim 7, in which said gas is formed from the burning of fuel and said additive is added to said particle-laden gas at a solids rate equivalent to adding to said gas a solution of 25% solids in 75% water at the rate of about 0.2–1.0 gallons of solution per ton of fuel burned to produce said gas.

9. The method of claim 7, in which said diammonium phosphate and urea are present in proportions by weight of about 3:2.

10. The method of claim 9, in which said gas is formed from the burning of fuel and said additive is added to said particle-laden gas at a solids rate equivalent to adding to said gas a solution of 25% solids in 75% water at the rate of about 0.2–1.0 gallons of solution per ton of fuel burned to produce said gas.

11. The method of claim 1, in which said mixture is formed after the particle-laden gas has passed through a heat-exchange means.

12. The method of claim 11, in which said gas is formed from the burning of fuel and said additive is added to said particle-laden gas at a solids rate equivalent to adding to said gas a solution of 25% solids in 75% water at the rate of about 0.2–1.0 gallons of solution per ton of fuel burned to produce said gas.

13. The method of claim 11, in which said diammonium phosphate and urea are present in proportions by weight of about 3:2.

14. The method of claim 13, in which said gas is formed from the burning of fuel and said additive is added to said particle-laden gas at a solids rate equivalent to adding to said gas a solution of 25% solids in 75% water at the rate of about 0.2–1.0 gallons of solution per ton of fuel burned to produce said gas.

15. The method of claim 11, in which said conditioner is in the form of a water solution when mixed with said particle-laden gas.

16. The method of claim 15, in which said gas is formed from the burning of fuel and said additive is added to said particle-laden gas at a solids rate equivalent to adding to said gas a solution of 25% solids in 75% water at the rate of about 0.2–1.0 gallons of solution per ton of fuel burned to produce said gas.

17. The method of claim 15, in which said diammonium phosphate and urea are present in proportions by weight of about 3:2.

18. The method of claim 17, in which said gas is formed from the burning of fuel and said additive is added to said particle-laden gas at a solids rate equivalent to adding to said gas a solution of 25% solids in 75% water at the rate of about 0.2–1.0 gallons of solution per ton of fuel burned to produce said gas.

19. The method of claim 1, in which said mixture is formed at a temperature between 600°–1400° F.

20. The method of claim 19, in which said diammonium phosphate and urea are present in proportions by weight of about 3:2.

21. The method of claim 20, in which said gas is formed from the burning of fuel and said additive is added to said particle-laden gas at a solids rate equivalent to adding to said gas a solution of 25% solids in 75% water at the rate of about 0.05–1.5 gallons of solution per ton of fuel burned to produce said gas.

22. The method of claim 20, in which said gas is formed from the burning of fuel and said additive is added to said particle-laden gas at a solids rate equivalent to adding to said gas a solution of 25% solids in 75% water at the rate of about 0.1–0.5 gallons of solution per ton of fuel burned to produce said gas.

23. The method of claim 19, in which said gas is formed from the burning of fuel and said additive is added to said particle-laden gas at a solids rate equivalent to adding to said gas a solution of 25% solids in 75% water at the rate of about 0.05–1.5 gallons of solution per ton of fuel burned to produce said gas.

24. The method of claim 19, in which said gas is formed from the burning of fuel and said additive is added to said particle-laden gas at a solids rate equivalent to adding to said gas a solution of 25% solids in 75% water at the rate of about 0.1–0.5 gallons of solution per ton of fuel burned to produce said gas.

25. The method of claim 19, in which said conditioner is in the form of a water solution when mixed with said particle-laden gas.

26. The method of claim 25, in which said diammonium phosphate and urea are present in proportions by weight of about 3:2.

27. The method of claim 26, in which said gas is formed from the burning of fuel and said additive is added to said particle-laden gas at a solids rate equivalent to adding to said gas a solution of 25% solids in 75% water at the rate of about 0.05–1.5 gallons per ton of fuel burned to produce said gas.

28. The method of claim 26, in which said gas is formed from the burning of fuel and said additive is added to said particle-laden gas at a solids rate equivalent to adding to said gas a solution of 25% solids in 75% water at the rate of about 0.1–0.5 gallons per ton of fuel burned to produce said gas.

29. The method of claim 25, in which said gas is formed from the burning of fuel and said additive is added to said particle-laden gas at a solids rate equivalent to adding to said gas a solution of 25% solids in 75% water at the rate of about 0.05–1.5 gallons of solution per ton of fuel burned to produce said gas.

30. The method of claim 25, in which said gas is formed from the burning of fuel and said additive is added to said particle-laden gas at a solids rate equivalent to adding to said gas a solution of 25% solids in 75% water at the rate of about 0.1–0.5 gallons of solution per ton of fuel burned to produce said gas.

* * * * *

Disclaimer 4,325,711.—*Alfred E. Kober*, Bridgewater; and *Dennis F. Mahoney*, Three Bridges, N.J. METHOD OF CONDITIONING FLUE GAS AND SEPARATING THE PARTICLES THEREFROM. Patent dated Apr. 20, 1982. Disclaimer filed Mar. 10, 1983, by the assignee, *Economics Laboratory, Inc.*

Hereby enters this disclaimer to all claims of said patent.
[*Official Gazette May 10, 1983.*]